United States Patent Office 2,753,271
Patented July 3, 1956

2,753,271

VITREOUS ENAMELS AND ENAMELING PROCESSES

Arnold W. Treptow, Fanwood, N. J., assignor to Bell Telephone Laboratories, Incorporated, New York, N. Y., a corporation of New York No Drawing. Application August 1, 1952,
Serial No. 302,239

10 Claims. (Cl. 106—48)

This invention relates to vitreous enamels, to objects coated with vitreous enamels and to methods of forming enamel coatings. More particularly the invention is concerned with enamels having a satiny or fine textured matte finish.

Vitreous enamel coatings are ordinarily formed on surfaces by applying a coating containing a finely divided glass frit and firing the coating at a temperature sufficient to fuse it into a continuous, homogeneous layer. These enamels, because of their glassy nature, have surfaces exhibiting a high gloss. It is often desirable, in order to improve appearance or to reduce light reflectivity so as to improve legibility of printed characteristics on the enameled surface, that an enameled surface be produced which has a matte rather than a gloss finish.

Attempts have been made to produce such a matte finish by mixing with the finely divided frit a finely divided refractory material which is insoluble in the fused glass and which, therefore, remains as a dispersed phase in the finished enamel thus reducing the reflectance from the glossy surface. However, since most highly refractory materials are white, this approach made it impossible to secure enamels of deep color and particularly unfeasible to produce jet black enamels. Moreover, enamel coatings produced in this manner tended to exhibit a surface scum or to possess a seriously impaired adherence.

According to the present invention, an enameled coating having a matte finish is produced by utilizing a frit from which, under the conditions under which the enameled coating is fired, dispersed crystals are directly formed in the glassy matrix. In this manner a satiny finish is obtained which is comparable to the satiny finishes obtained with organic coatings. This result is achieved without impairment of the color of the enamel or its adherence.

The frits from which the enamels of the present invention are prepared have compositions, in terms of oxides, falling within the following limits:

| Oxide: | Percent |
|---|---|
| $Na_2O$ | 4 to 12 |
| $K_2O$ | 4.5 to 11 |
| $Li_2O$ | 0 to 3 |
| $B_2O_3$ | 8 to 12 |
| $Al_2O_3$ | 0 to 10 |
| $SiO_2$ | 30 to 47 |
| $TiO_2$ | 7 to 18 |
| CaO | 7 to 18 |
| MgO | 0 to 5 |
| $ZrO_2$ | 0 to 3 |
| Colored oxide | 0 to 17 |

The total alkali metal oxide in the frit should not exceed 18 percent by weight. The ratio of $TiO_2$ to CaO in the frit should have a value between 2:1 and 1:1.5.

The colored oxide is added to impart any desired color to the enamel and may consist of any of the solid oxides, or mixtures thereof, commonly used in the art for coloring enamels. Preferably, at least 1 percent of the colored oxide or mixture is present in the enamel. The term, colored oxide, is intended to include the white oxides, such as sodium antimonate or tin oxide, which are commonly used for imparting a white color to enamels.

When a black enamel is desired, it is preferable that the colored oxide consist of one or more oxides of elements having an atomic number between 24 and 29 and that this oxide or mixture of oxides be present in an amount between about 4 percent and about 17 percent. Smaller amounts of these same oxides can be used, alone or in mixture with other coloring oxides, to produce lighter colors.

The glass frit, obtained by fusing the requisite materials containing the stated oxides in the proper proportions, is reduced to a finely divided state for the preparation of the enamel. A particle size of 250 microns and less will ordinarily be found convenient for such use. In order to form an enamel coating, the frit is ordinarily formed into an enamel slip by mixture with water and a small amount of a clay binder. It has been found that the addition to the slip of a small amount of very finely divided aluminum oxide or complex calcium titanium silicate, having the composition set forth below, is advantageous in that these compounds tend to seed the formation of the dispersed crystals during subsequent firing.

A coating of this slip is formed on the object to be coated as by dipping or spraying and the coating is then dried. The coating is then fired at a temperature in the vicinity of 800° C. for about ten minutes. During this firing the coating is converted into a glassy matrix containing precipitated crystals of a calcium titanium silicate ($CaO \cdot TiO_2 \cdot SiO_2$). This coating has the desirable characteristics set forth above.

A particularly desirable enamel having a black matte finish is formed from a frit having a composition in terms of oxides as follows:

| Oxide: | Percent by weight |
|---|---|
| $Na_2O$ | 7.5 |
| $K_2O$ | 9.5 |
| $Li_2O$ | 0.7 |
| $B_2O_3$ | 11.0 |
| $Al_2O_3$ | 5.1 |
| $SiO_2$ | 36.3 |
| $TiO_2$ | 10.0 |
| CaO | 10.0 |
| $Co_3O_4$ | 2.2 |
| $MnO_2$ | 4.4 |
| CuO | 2.2 |
| $Fe_3O_4$ | 1.1 |

A frit having this oxide composition can conveniently be formed by fusing together the following ingredients in the following proportions:

| | Parts by weights |
|---|---|
| Borax ($Na_2B_4O_7 \cdot 10H_2O$) | 30.1 |
| $NaNO_3$ | 5.5 |
| $Na_2CO_3$ | 1.0 |
| $K_2CO_3$ | 13.9 |
| $Li_2SiO_3$ | 2.1 |
| $Al_2O_3$ | 5.1 |
| $SiO_2$ | 34.9 |
| $TiO_2$ | 10.0 |
| $CaCO_3$ | 17.9 |
| $Co_3O_4$ | 2.2 |
| $MnO_2$ | 4.4 |
| CuO | 2.2 |
| $Fe_3O_4$ | 1.1 |

A particularly desirable slip can be formed from this frit after it has been reduced to a particle size of about 250 microns and less by milling the following ingredients in the following proportions:

| | Parts by weight |
|---|---|
| Frit (250 microns and less) | 100.0 |
| Mixture of black oxides of chromium, iron and cobalt | 2.0 |
| Aluminum oxide (about 2 microns) | 1.0 |
| Clay | 3.3 |
| Sodium nitrite | 0.165 |
| Water | 51.0 |

The proportions of ingredients in the slips of the present invention are not extremely critical. For each 100 parts of frit it is ordinarily desirable to use between 25 parts and 60 parts by weight of water and between about 2.5 parts and about 4 parts by weight of clay binder. The aluminum oxide or other seeding agent is ordinarily present in amounts between .5 part and 2 parts by weight. The particle size of the aluminum oxide or other seeding agent should not exceed about 15 microns and is preferably about 2 microns. The black oxides of chromium, iron and cobalt, when employed, are desirably present in amounts between 2 parts and 5 parts by weight. These oxides enhance the black color of the finished enamel and also act to a certain extent as seeding agents in the same manner as the aluminum oxide. The sodium nitrite is present as an electrolyte or setup agent for its effect upon the viscosity, mobility and consistency of the slip. Other electrolytes commonly used for this purpose may be substituted in the commonly used proportions.

The temperature at which the enamel is fired and the duration of the firing are relatively critical since they determine the size and number of dispersed crystals which are formed in the glassy matrix. The firing temperature should be maintained between 750° C. and 825° C. for a time between 4 minutes and 15 minutes. Firing at 800° C. for about 10 minutes is particularly desirable.

No unusual base preparation is required for the application of the enamel. Where the enamel is to be applied to an iron base, it has been found that particularly desirable results are obtained by the use of iron containing between .2 per cent and .5 per cent of added titanium, which acts to stabilize any carbon which is present by forming titanium carbide. This eliminates the formation of carbon oxide gases at the enameling temperatures and consequently the resulting enamels are more free of imperfections such as pits or blisters.

The invention has been described above in terms of specific embodiments and, since certain modifications and equivalents may be apparent to those skilled in the art, this description is intended to be illustrative of, but not necessarily to constitute a limitation upon, the scope of the invention.

What is claimed is:

1. A vitreous enamel frit having the following composition, in terms of oxides:

| Oxide: | Percent by weight |
|---|---|
| $Na_2O$ | 7.5 |
| $K_2O$ | 9.5 |
| $Li_2O$ | 0.7 |
| $B_2O_3$ | 11.0 |
| $Al_2O_3$ | 5.1 |
| $SiO_2$ | 36.3 |
| $TiO_2$ | 10.0 |
| $CaO$ | 10.0 |
| $Co_3O_4$ | 2.2 |
| $MnO_2$ | 4.4 |
| $CuO$ | 2.2 |
| $Fe_3O_4$ | 1.1 |

2. An enamel slip composition comprising an aqueous suspension of finely divided particles of the frit described in claim 1 together with between about 2.5 parts and about 4 parts by weight of clay per 100 parts of frit.

3. An enamel slip composition comprising an aqueous suspension of finely divided particles of the frit described in claim 1 together with 2.5 parts to 4 parts of clay per 100 parts of frit and .5 part to 2 parts of finely divided aluminum oxide per 100 parts of frit.

4. An enamel slip composition comprising the following ingredients in the following proportions:

| | Parts by weight |
|---|---|
| Frit described in claim 1 | 100 |
| Mixture of black oxides of chromium, iron and cobalt | 2 to 5 |
| Clay | 2.5 to 4 |
| Aluminum oxide | .5 to 2 |
| Water | 25 to 60 | wherein the aluminum oxide has an average particle size not exceeding about 15 microns.

5. An enamel slip composition consisting of the following ingredients in the following proportions:

| | Parts by weight |
|---|---|
| Frit described in claim 1 | 100 |
| Mixture of black oxides of chromium, iron and cobalt | 2 |
| Aluminum oxide | 1 |
| Clay | 3.3 |
| Sodium nitrite | 0.165 |
| Water | 51 | wherein the frit has an average particle size not exceeding about 250 microns and the aluminum oxide has an average particle size of about 2 microns.

6. The process of coating a body with a vitreous enamel having a black matte finish which comprises by coating said body with the enamel slip described in claim 5, drying said coating and firing said coating at a temperature between 750° C. and 825° C. for a time between 4 minutes and 15 minutes.

7. An enamel slip consisting of the following ingredients in the following proportions:

| | Parts by weight |
|---|---|
| Frit defined in claim 1 | 100 |
| Aluminum oxide | 1 |
| Clay | 3.3 |
| Sodium nitrite | 0.165 |
| Water | 51 |

8. An enamel slip composition comprising an aqueous suspension of finely divided particles of a frit having a composition which in terms of oxides consists of the following:

| Oxide: | Percent by weight |
|---|---|
| $Na_2O$ | 4 to 12 |
| $K_2O$ | 4.5 to 11 |
| $Li_2O$ | 0 to 3 |
| $B_2O_3$ | 8 to 12 |
| $Al_2O_3$ | 0 to 10 |
| $SiO_2$ | 30 to 47 |
| $TiO_2$ | 7 to 18 |
| $CaO$ | 7 to 18 |
| $MgO$ | 0 to 5 |
| $ZrO_2$ | 0 to 3 |
| Colored oxide of at least one element having an atomic number between 24 and 29 | 4 to 17 | together with 2.5 parts to 4 parts of clay per 100 parts of frit and .5 part to 2 parts of finely divided aluminum oxide per 100 parts of frit, the aluminum oxide acting to seed the precipitation of calcium titanium silicate crystals during the firing of the enamel, the total amount of alkali metal oxide in said frit not exceeding 18 per cent and the ratio of $TiO_2$ to $CaO$ in said frit being between 2:1 and 1:1.5.

9. The process of forming a vitreous enamel coating having a fine-textured matte finish which comprises firing a coating of the slip defined in claim 8 at a temperature between 750° C. and 825° C. for a time between 4 minutes and 15 minutes.

10. An enamel slip consisting of the ingredients set forth in claim 8 in the proportions set forth in claim 8 and in addition about 0.165 part by weight of sodium nitrite per 100 parts of the frit.

References Cited in the file of this patent

UNITED STATES PATENTS

| | | |
|---|---|---|
| 2,414,633 | Bryant | Jan. 21, 1947 |
| 2,590,893 | Sanborn | Apr. 1, 1952 |

FOREIGN PATENTS

| | | |
|---|---|---|
| 9,611 | Great Britain | 1893 |
| 446,970 | Great Britain | 1936 |
| 573,449 | Great Britain | 1945 |

OTHER REFERENCES

Enamel Bibliography and Abstracts (1944), page 291 (4).

Enamel Bibliography and Abstracts (1953), page 428 (c).